US011698222B2

(12) United States Patent
Edge et al.

(10) Patent No.: US 11,698,222 B2
(45) Date of Patent: Jul. 11, 2023

(54) FOOD PRESERVATION SYSTEM WITH FILTERED WATER SUPPLY TO ICEMAKER

(71) Applicant: Electrolux Home Products, inc., Charlotte, NC (US)

(72) Inventors: Matthew Edge, Anderson, SC (US); Marcello Machado, Anderson, SC (US); Thomas McCollough, Anderson, SC (US); James T. McHan, Anderson, SC (US); Jose Macias, Anderson, SC (US); Raony Barrios, Anderson, SC (US); Mark Holle, Anderson, SC (US)

(73) Assignee: Electrolux Home Products, Inc., Charlotte, NC (US)

( * ) Notice: Subject to any disclaimer, the term of this patent is extended or adjusted under 35 U.S.C. 154(b) by 115 days.

(21) Appl. No.: 17/142,322

(22) Filed: Jan. 6, 2021

(65) Prior Publication Data

US 2022/0214103 A1 Jul. 7, 2022

(51) Int. Cl.
*F25C 1/00* (2006.01)
*F25D 29/00* (2006.01)
(Continued)

(52) U.S. Cl.
CPC ............ *F25D 29/00* (2013.01); *B01D 35/147* (2013.01); *F25C 1/00* (2013.01); *F25D 23/126* (2013.01);
(Continued)

(58) Field of Classification Search
CPC ........... F25D 2323/121; F25D 2300/00; F25D 13/02; F25D 29/00; F25D 11/02;
(Continued)

(56) References Cited

U.S. PATENT DOCUMENTS 5,135,645 A * 8/1992 Sklenak ............... B01D 35/153
210/441
5,816,068 A 10/1998 Oh et al.
(Continued)

FOREIGN PATENT DOCUMENTS

IT CZ20100013 7/2012
KR 20000041567 A 7/2000
(Continued)

*Primary Examiner* — Cassey D Bauer
(74) *Attorney, Agent, or Firm* — Pearne & Gordon LLP

(57) ABSTRACT

A food preservation system including a refrigerator and a freezer, wherein the refrigerator and freezer are independent from each other; the refrigerator comprising a fresh food compartment; the freezer including an icemaker and means for receiving filtered water; a water filter located in the fresh food compartment; a water supply line leading into an inflow side of the water filter; a refrigerator inlet valve connected to an inlet side of the water filter and a water distribution valve, wherein the water distribution valve comprises an auxiliary icemaker water valve, the distribution valve connected to an outflow side of the water filter; tubing connecting an outflow side of the auxiliary icemaker water valve to the icemaker; and a refrigerator main controller, wherein the refrigerator main controller is in operable communication with the refrigerator inlet valve and the auxiliary icemaker water valve is provided, Methods to make ice with filtered water are also provided.

11 Claims, 3 Drawing Sheets

(51) Int. Cl.
*F25D 23/12* (2006.01)
*B01D 35/147* (2006.01)

(52) U.S. Cl.
CPC ...... *F25C 2400/10* (2013.01); *F25C 2400/14* (2013.01); *F25C 2600/04* (2013.01); *F25D 2323/121* (2013.01)

(58) Field of Classification Search
CPC .......... F25D 15/00; F25D 1/00; F25D 23/126; F25C 2400/10; F25C 2400/14; F25C 2600/04
See application file for complete search history.

(56) References Cited

U.S. PATENT DOCUMENTS

| | | |
|---|---|---|
| 6,276,146 B1 | 8/2001 | Kim et al. |
| 7,284,680 B2 | 10/2007 | Farano et al. |
| 7,475,555 B2 | 1/2009 | Janardhanam et al. |
| 7,596,964 B2 | 10/2009 | Lim et al. |
| 8,245,524 B2 * | 8/2012 | Kuehl .................... F25D 13/04 62/185 |
| 9,677,802 B2 | 6/2017 | Lee |
| 10,054,358 B2 | 8/2018 | Park et al. |
| 2004/0226304 A1 * | 11/2004 | Gerner .................... F25D 29/00 62/132 |
| 2009/0120122 A1 | 5/2009 | Gradl et al. |
| 2012/0104021 A1 * | 5/2012 | Cur ....................... F25D 23/126 99/323.1 |
| 2018/0149406 A1 | 5/2018 | Zhang et al. |

FOREIGN PATENT DOCUMENTS

| | | |
|---|---|---|
| KR | 20050117830 A | 12/2005 |
| WO | WO2004085937 | 10/2004 |
| WO | WO2012052324 | 4/2012 |

* cited by examiner

FOOD PRESERVATION SYSTEM WITH FILTERED WATER SUPPLY TO ICEMAKER

FIELD OF INVENTION

The instant invention relates a food preservation system with a filtered water supply to an icemaker located in a freezing compartment.

BACKGROUND OF THE INVENTION

Conventional refrigerating appliances, such as domestic refrigerators, typically have both a fresh food compartment and a freezer compartment or section. The fresh food compartment is where food items such as fruits, vegetables, and beverages are stored. The freezer compartment is where food items that are to be kept in a frozen condition are stored. The refrigerating appliances are provided with refrigeration systems that maintains the fresh food compartment at temperatures above 0° C., such as between 0.25° C. and 4.5° C. and the freezer compartments at temperatures below 0° C., such as between 0° C. and −20° C.

Icemakers are generally located in a freezer compartment and are fed with a water supply. Water filters cannot be located in a freezer compartment as the water would freeze in the filter assembly before being fed into the icemaker. Accordingly, water supply to icemakers is frequently unfiltered. This is particularly true for those food preservation systems in which the freezer compartment and fresh food compartments are two separate and independent units. Such separate and independent freezer and fresh food compartments are sometimes referred to as Tall Twins but may have other configurations as well. In some instances, a water filter for water supply to an icemaker in such food preservation systems are located outside either the refrigerator or the freezer, such as along an outside back panel or above or below the freezer or refrigerator.

Because consumers may have less than optimal water supply, there is a need for systems to filter water supplied to an icemaker, particularly in those food preservation systems in which the freezer compartment and fresh food compartments are separate and independent from each other.

SUMMARY OF THE INVENTION

The instant invention is a food preservation system including a freezer compartment and a fresh food compartment, separate and independent of each other, and a system for supplying filtered water to an icemaker in the freezer compartment.

In a first embodiment, the invention is a food preservation system comprising a refrigerator and a freezer, wherein the refrigerator and freezer are independent from each other; the refrigerator comprising a fresh food compartment; the freezer including an icemaker and means for receiving filtered water; a water filter located in the fresh food compartment; a water supply line leading into an inflow side of the water filter; a refrigerator inlet valve connected to an inlet side of the water filter and a water distribution valve, wherein the water distribution valve comprises an auxiliary icemaker water valve, the distribution valve connected to an outflow side of the water filter; tubing connecting an outflow side of the auxiliary icemaker water valve to the icemaker; and a refrigerator main controller, wherein the refrigerator main controller is in operable communication with the refrigerator inlet valve and the auxiliary icemaker water valve.

In another embodiment, the invention provides the food preservation system wherein the refrigerator and freezer are located adjacent to each other.

In yet another embodiment, the invention provides a food preservation system, wherein the refrigerator and freezer are located distantly apart from each other.

In yet another embodiment, the invention provides the food preservation system according to any of the foregoing embodiments, and further comprising means for operable communication between the main refrigerator controller, the refrigerator inlet valve, and/or the auxiliary icemaker water valve.

In yet another embodiment, the invention provides the food preservation system according to any of the foregoing embodiments, and further comprising a freezer main controller, wherein the freezer main controller is in operable communication with the refrigerator main controller, refrigerator inlet valve, and/or refrigerator auxiliary icemaker water valve.

In yet another embodiment, the invention provides the food preservation system according to any of the foregoing embodiments, and wherein the freezer main controller is in operable communication with the refrigerator main controller.

In yet another embodiment, the invention provides the food preservation system according to any of the foregoing embodiments, and wherein the freezer main controller is in operable communication with the refrigerator inlet valve and/or the refrigerator auxiliary icemaker water valve.

In yet another embodiment, the invention provides the food preservation system according to any of the foregoing embodiments, and wherein the freezer further comprises means to deliver unfiltered water to the icemaker.

In yet another embodiment, the invention provides the food preservation system according to any of the foregoing embodiments, and wherein the freezer main controller is in direct communication with the refrigerator inlet valve and the refrigerator auxiliary icemaker water valve, and wherein a signal from the freezer main controller is capable of opening the refrigerator inlet valve and the refrigerator auxiliary icemaker water valve.

In yet another embodiment, the invention provides the food preservation system according to any of the foregoing embodiments, and wherein the freezer further comprises means to allow a user to choose whether unfiltered water or filtered water is delivered to the icemaker.

In yet another embodiment, the invention provides the food preservation system according to any of the foregoing embodiments, and wherein the refrigerator further comprises means to allow a user to choose whether unfiltered water or filtered water is delivered to the icemaker.

In yet another embodiment, the invention provides a method for producing ice in a food preservation system, comprising the steps of providing a refrigerator and a freezer, the refrigerator comprising a fresh food compartment, the freezer including an icemaker and means for receiving filtered water; a water filter located in the fresh food compartment; providing an external water supply to a refrigerator inlet valve; pumping water from the refrigerator inlet valve to a water filter in which filtered water is produced; flowing filtered water to a distribution valve which comprises a refrigerator auxiliary icemaker valve; pumping water through the refrigerator auxiliary icemaker valve to the icemaker.

In an alternative embodiment, the invention provides the method for producing ice in a food preservation system according to any of the foregoing embodiments, and further comprising the steps of controlling the flow of filtered water to the icemaker by the following steps sending a signal from a freezer main controller to a refrigerator main controller; and sending a signal from the refrigerator main controller to the refrigerator inlet valve and the refrigerator auxiliary icemaker valve for a pre-determined time.

In an alternative embodiment, the invention provides the method for producing ice in a food preservation system according to any of the foregoing embodiments, and further comprising the steps of terminating the signal from the refrigerator main controller to the refrigerator inlet valve and the refrigerator auxiliary icemaker valve, thereby shutting the refrigerator inlet valve and the refrigerator auxiliary icemaker valve and terminating the flow of filtered water to the icemaker.

In an alternative embodiment, the invention provides the method for producing ice in a food preservation system according to any of the foregoing embodiments, and further comprising the steps of controlling the flow of filtered water to the icemaker by the following steps sending a signal from a freezer main controller to the refrigerator inlet valve and the refrigerator auxiliary icemaker valve for a pre-determined time.

In an alternative embodiment, the invention provides the method for producing ice in a food preservation system according to any of the foregoing embodiments, and further comprising the steps of terminating the signal from the freezer main controller to the refrigerator inlet valve and the refrigerator auxiliary icemaker valve, thereby shutting the refrigerator inlet valve and the refrigerator auxiliary icemaker valve and terminating the flow of filtered water to the icemaker.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities and scale shown.

DETAILED DESCRIPTION OF EMBODIMENTS OF THE INVENTION

Figure 1:
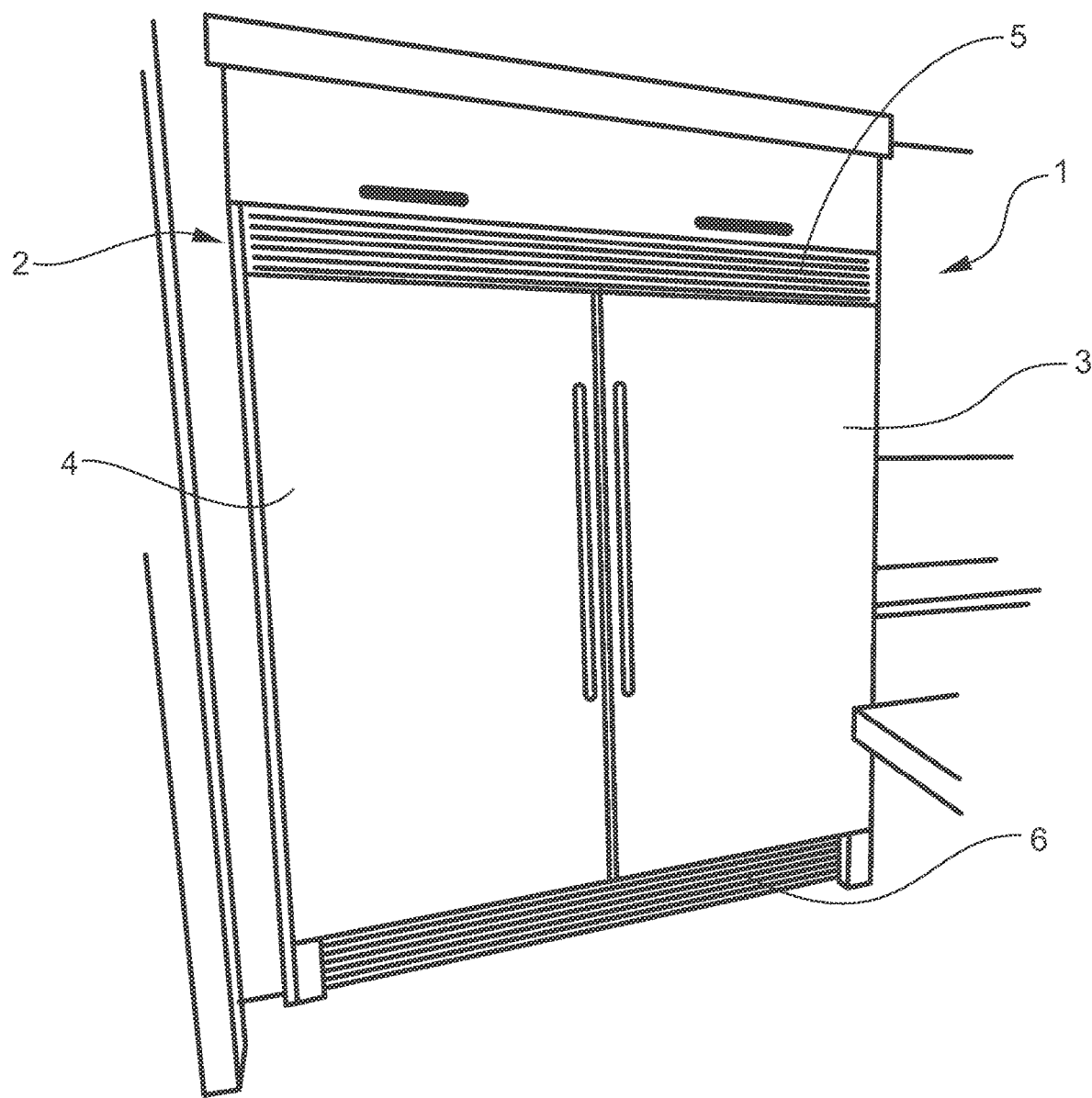
FIG. 1 is a front perspective view of a prior art food preservation system in which the independent and separate freezer and refrigerator are placed adjacent to each other.

Embodiments of a refrigerating appliance or a component thereof now will be described with reference to the accompanying drawings. Whenever possible, the same reference numerals are used throughout the drawings to refer to the same or like parts.

Referring to FIG. 1, a prior art refrigerator and freezer combination is illustrated. A refrigerator 1 is placed adjacent to a freezer 2. Refrigerator door 3 encloses a fresh food compartment. Freezer door 4 encloses a frozen food compartment. Each of refrigerator 1 and freezer 2 are self contained, independent units which may operate their intended purposes without control by or interaction with the other. However, as shown in FIG. 1, refrigerator 1 and freezer 2 are placed up against each other along a side. Further, FIG. 1 illustrates the refrigerator 1 and freezer 2 joined along the top by a common head grill 5 and along the bottom by a common toe grill 6. The common head grill 5 and common toe grill 6 are for aesthetic purposes and do not prevent the refrigerator 1 and freezer 2 from operating independently.

Figure 2:
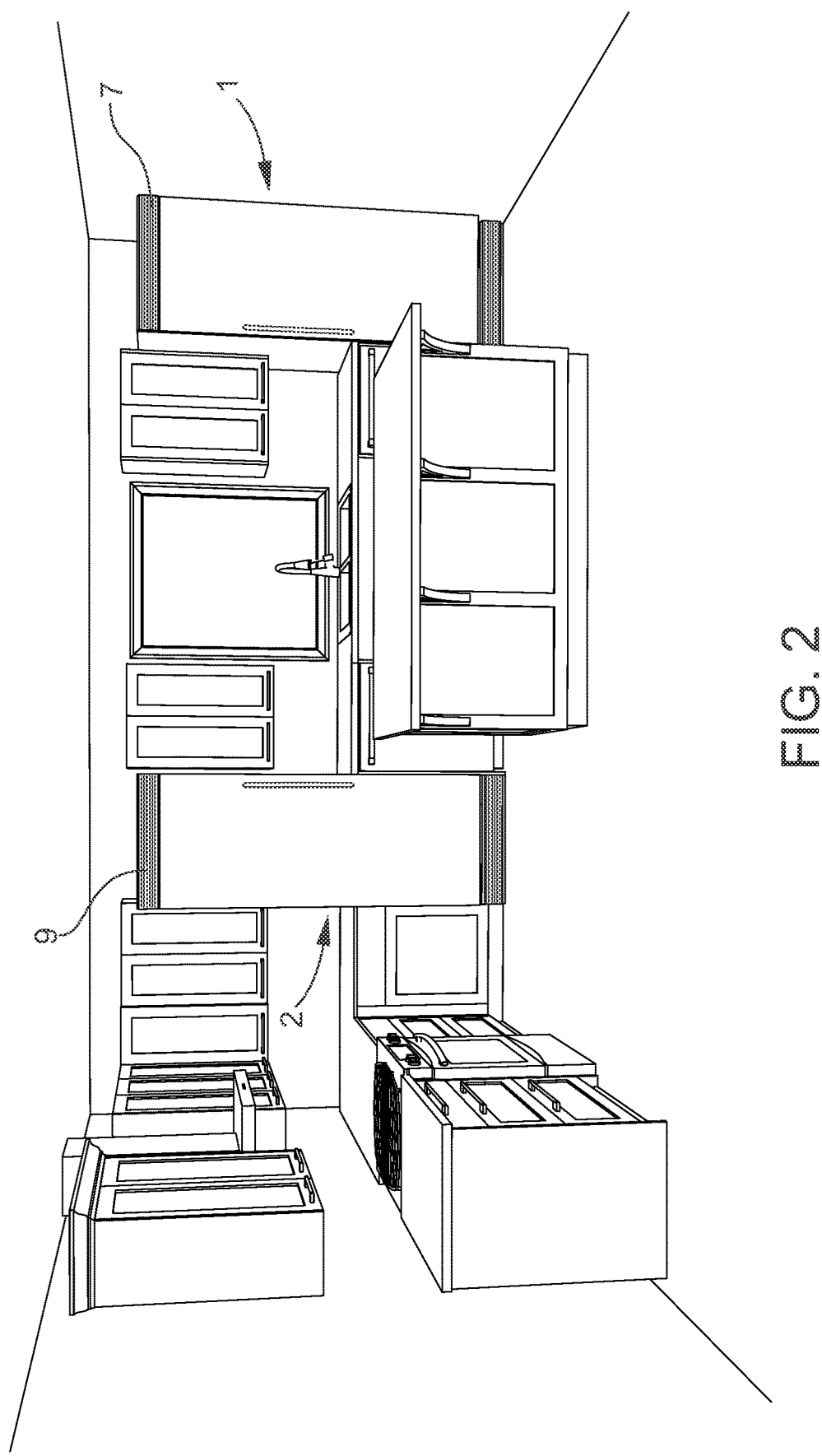
FIG. 2 is a perspective view of a prior art food preservation system in which the independent and separate freezer and refrigerator are placed distantly apart from each other.

FIG. 2 illustrates a refrigerator 1 and a freezer 2 which are located distantly from each other, wherein no part of the refrigerator 1 abuts or touches freezer 2. In FIG. 2, refrigerator 1 is equipped with its own head grill 7 and toe grill 8. Further, freezer 2 is equipped with its own head grill 9 and toe grill 10. All of head grills 5, 7, and 9 and toe grills 6, 8, and 10 are optional.

Embodiments of the invention are applicable to either situation wherein the refrigerator 1 and freezer 2 are adjacent, or have some part of the refrigerator 1 touching some part of the freezer 2, or the refrigerator 1 and freezer 2 are inches apart from each, or the refrigerator 1 and freezer 2 are feet or even yards apart from each other.

Figure 3:
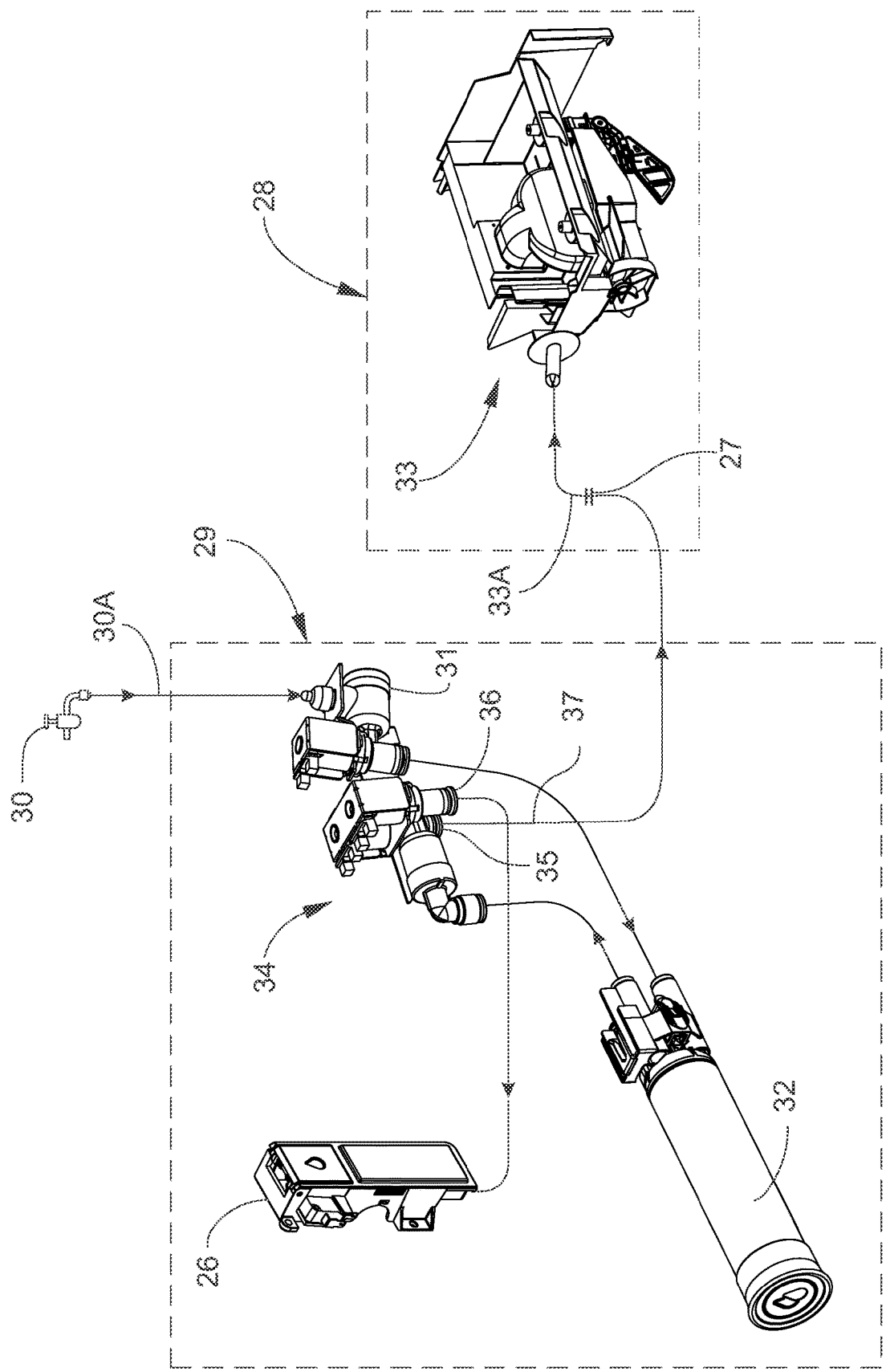
FIG. 3 is schematic illustrating the water flow utilized in certain embodiments of the invention.

Referring now to FIG. 3, an embodiment of a water flow scheme used in some embodiments of the invention is schematically shown. The components contained in box 29 are generally located on or in the refrigerator 1. The components contained in box 28 are generally located on or in the freezer 2. Water from a main water supply 30, generally external to the food preservation system, is sent through main water supply line 30a to a refrigerator inlet valve 31. The main water supply 30 can be, for example, a residence water supply from a municipal or similar water system, or a well. The refrigerator inlet valve 31 then passes the water to a filter 32. Any filtering system amenable to use with refrigerators and/or freezers and employed to filter impurities from water may be used. After passing through the water filter 32, the filtered water may be passed to a distribution valve 34. Distribution valve 34 may include one or more valves which pass the water for use or dispensing. For example, the distribution valve 34 may include a refrigerator auxiliary icemaker valve 35 which sends filtered water to an icemaker 33 through tube 37 and icemaker supply line 33a. Tube 37 and icemaker supply line 33a may be a single conduit or may be separate conduits connected, for example, by a fitting 27. Distribution valve 34 may also include, for example, a water dispenser valve 36, which sends filtered water to a water dispenser. The refrigerator auxiliary icemaker valve 35 pumps filtered water to an icemaker by way of a water tube 37. In the illustrated embodiment, the icemaker 33 is located in a freezer 2. Tube 37 extends from the auxiliary icemaker valve 34, exiting the refrigerator 1, passing to the freezer location, entering the freezer 2 and connecting to the icemaker 33.

Refrigerator inlet valve 31, filter 32, and distribution valve 34 are located in or on the refrigerator 1. Locations for these components may be within the fresh food compartment, on a back exterior wall of the fresh food compartment, or in a utility area, frequently located at a rear, lower portion of the refrigerator. In a particular embodiment, the water filter 32 is housed in the fresh food compartment.

Water filters useful in the invention include, but are not limited to, cartridge particle filters, charcoal filters, pocket or packet filters, reverse osmosis filters, and the like.

The freezer 2 comprises an icemaker and means for receiving filtered water. Icemakers generally manufacture ice by convection, i.e., by circulating cold air over, under and/or along the side of water in an ice tray to freeze the water into ice cubes. The icemakers conventionally include an ice tray with a plurality of cavities for forming the ice cubes. Water is fed or injected into the cavities and then frozen to form the ice cubes. The means for receiving filtered water into the icemaker includes tubing entering the freezer and extending to an icemaker water feed. The icemaker water feed may take any form suitable for dispensing water into an icemaker, such as a nozzle or a simple tube open end. Other components may include one or more valves to turn on or shut off the filtered water flow proximate to the icemaker.

The refrigerator used in inventive embodiments includes a refrigerator main controller. The refrigerator main controller includes circuitry and programming to control various functions of the refrigerator including, for example, refrigerator temperature, water and/or ice dispensing. The refrigerator main controller is configured to operably communicate to each of the refrigerator inlet valve and the auxiliary icemaker valve. For example, the refrigerator main controller may be configured to send an electrical signal to each of the refrigerator inlet valve and the auxiliary icemaker valve. Generally, the valves are configured to open upon receipt of such electrical signal and to close upon termination of the electrical signal.

In some embodiments of the inventive fresh food preservation system, the freezer includes a freezer main controller. The freezer main controller includes circuitry and programming to control various freezer functions, such as maintaining freezer temperature, filling an ice tray with water, and discharging water from an ice tray. In some embodiments, the freezer main controller is configured to operably communicate with the refrigerator main controller. In some embodiments, the freezer main controller is configured to operably communicate with the refrigerator inlet valve and/or refrigerator auxiliary icemaker valve. In some embodiments, the operable communication is accomplished by electric signals. In one embodiment, the electrical signal to the refrigerator inlet valve and/or refrigerator auxiliary icemaker valve opens and/or closes the valves.

In a particular embodiment, the freezer main controller sends a signal to the refrigerator main controller, thereby causing the refrigerator main controller to send a signal to the refrigerator inlet valve and/or refrigerator auxiliary icemaker valve to cause the valve(s) to open. In yet another embodiment, the freezer main controller sends a signal to the refrigerator inlet valve and/or refrigerator auxiliary icemaker valve to cause the valve(s) to open, In yet another embodiment, the freezer further includes an unfiltered water supply to the icemaker. For example, the freezer may include a freezer water valve which is configured to deliver water from an external water supply to the icemaker. In such cases, the external water supply is not filtered prior to delivery to the icemaker.

In yet another embodiment, the freezer main controller operably communicates with the freezer water valve such that the freezer main controller may cause the freezer water valve to send unfiltered water to the ice tray. In some embodiments, the freezer and/or the refrigerator includes a user interface. In a particular embodiment, the user interface permits a user to choose whether filtered water from the refrigerator or unfiltered water from the freezer is fed to the icemaker.

What is claimed is:

1. A food preservation system comprising:
    a refrigerator and a freezer, wherein the refrigerator and freezer are each self contained, independent units movable relative to each other;
    the refrigerator comprising a fresh food compartment;
    the freezer including an icemaker and a filtered water tubing;
    a water filter located in the fresh food compartment;
    a water supply line leading into an inflow side of the water filter;
    a refrigerator inlet valve connected to an inlet side of the water filter and a water distribution valve, wherein the water distribution valve comprises an auxiliary icemaker water valve, the distribution valve connected to an outflow side of the water filter;
    wherein the filtered water tubing connects an outflow side of the auxiliary icemaker water valve to the icemaker; and
    a refrigerator main controller, wherein the refrigerator main controller is in operable communication with the refrigerator inlet valve and the auxiliary icemaker water valve.

2. The food preservation system of claim 1, wherein the refrigerator and freezer are located adjacent to each other.

3. The food preservation system of claim 1, wherein the refrigerator and freezer are located distantly apart from each other.

4. The food preservation system of claim 1, wherein the main refrigerator controller is configured to be in operable communication with the refrigerator inlet valve, and/or the auxiliary icemaker water valve.

5. The food preservation system of claim 1, further comprising a freezer main controller, wherein the freezer main controller is in operable communication with the refrigerator main controller, refrigerator inlet valve, and/or refrigerator auxiliary icemaker water valve.

6. The food preservation system of claim 5, wherein the freezer main controller is in operable communication with the refrigerator main controller.

7. The food preservation system of claim 5, wherein the freezer main controller is in operable communication with the refrigerator inlet valve and/or the refrigerator auxiliary icemaker water valve.

8. The food preservation system of claim 1, wherein the freezer is further configured to deliver unfiltered water to the icemaker.

9. The food preservation system of claim 5, wherein the freezer main controller is in direct communication with the refrigerator inlet valve and the refrigerator auxiliary icemaker water valve, and wherein a signal from the freezer main controller is capable of opening the refrigerator inlet valve and the refrigerator auxiliary icemaker water valve.

10. The food preservation system of claim 5, wherein the freezer further comprises a user interface allowing a user to choose whether unfiltered water or filtered water is delivered to the icemaker.

11. The food preservation system of claim 5, wherein the refrigerator further comprises a user interface allowing a user to choose whether unfiltered water or filtered water is delivered to the icemaker.

* * * * *